Figure 1:
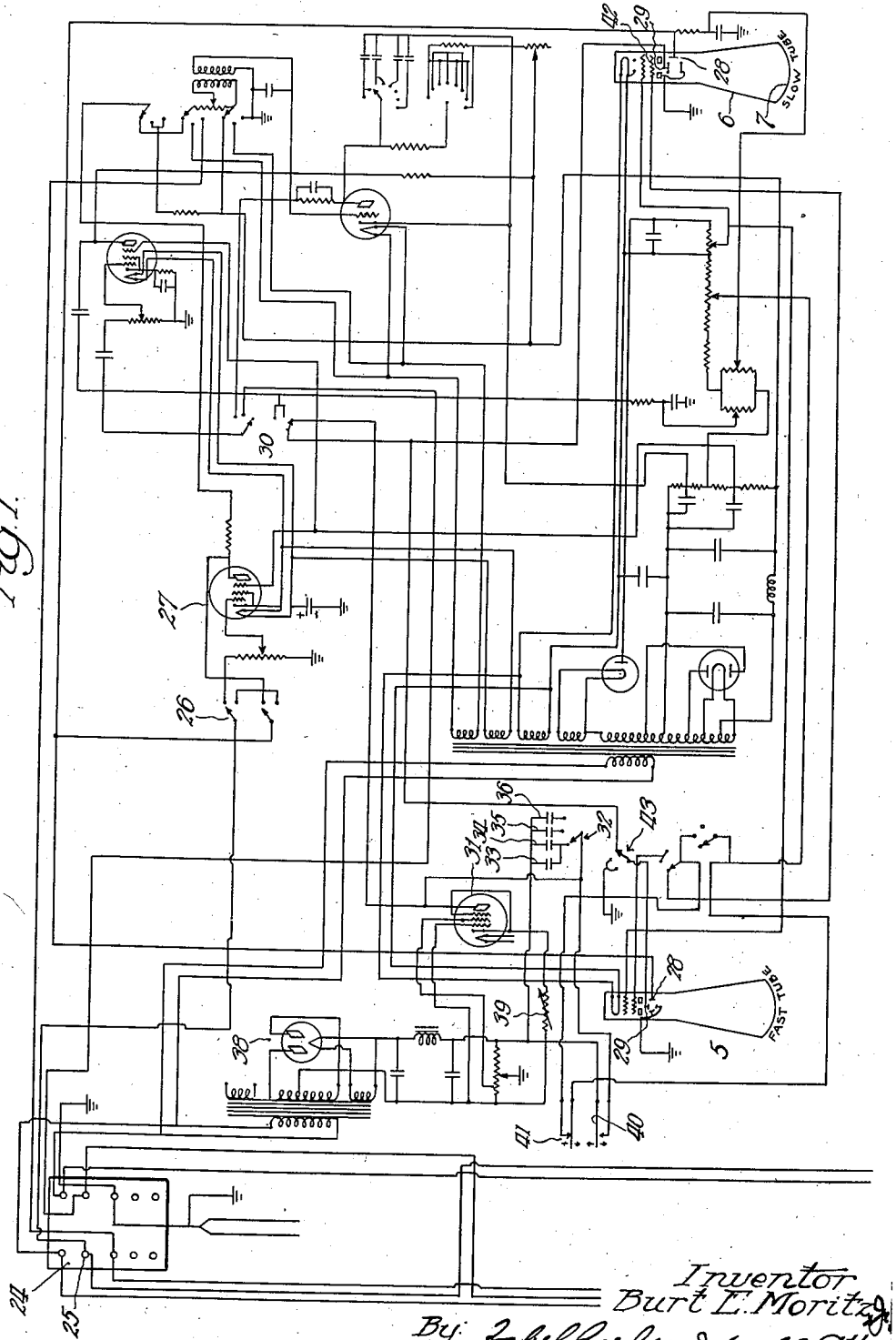

Jan. 9, 1940.  B. E. MORITZ, JR  2,186,388
MULTICONTROL OSCILLOGRAPH SYSTEM
Filed April 30, 1937   2 Sheets-Sheet 1

Inventor
Burt E. Moritz
By [attorneys signature]

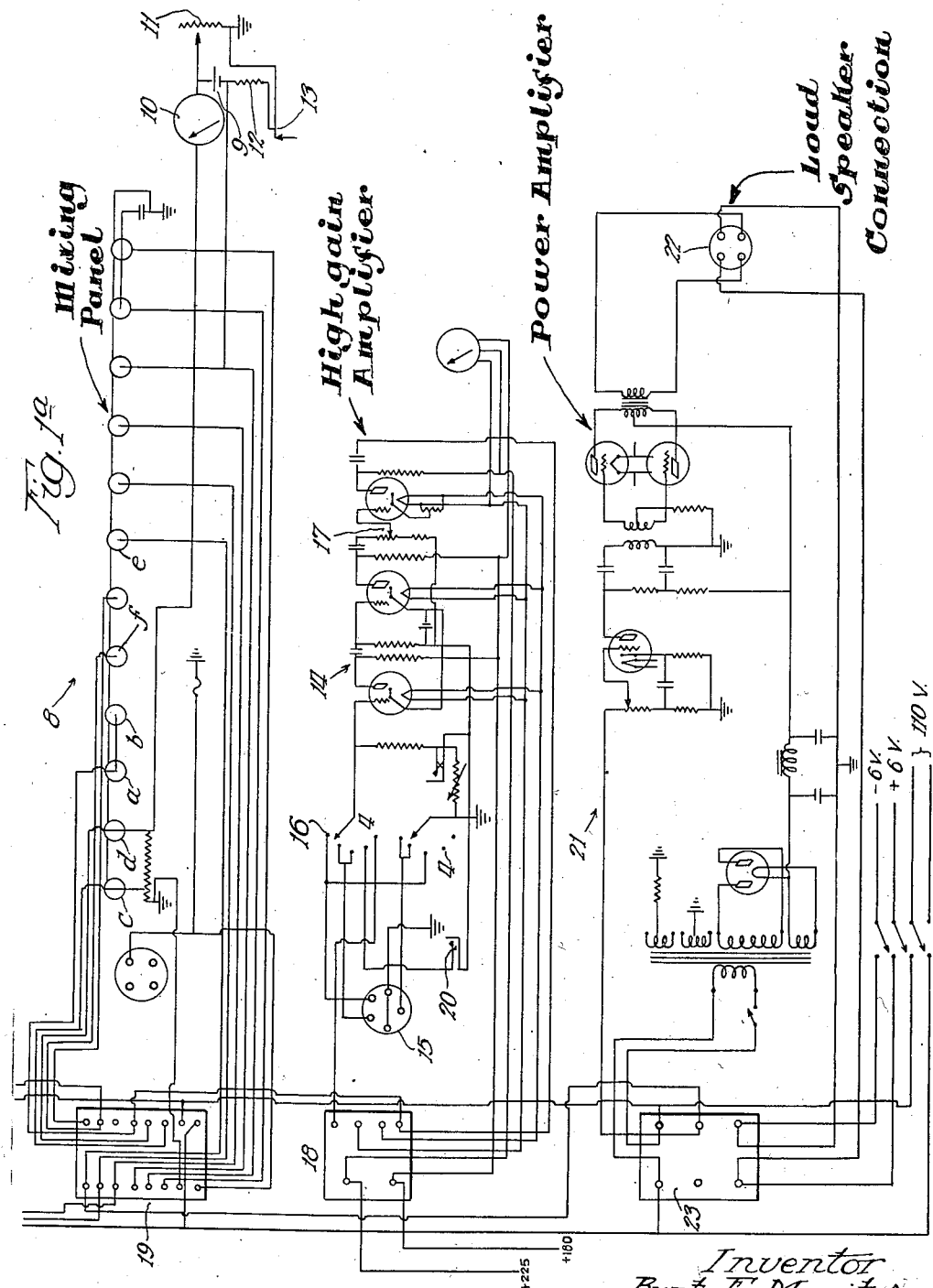

Patented Jan. 9, 1940

2,186,388

UNITED STATES PATENT OFFICE 2,186,388

MULTICONTROL OSCILLOGRAPH SYSTEM

Burt E. Moritz, Jr., Denver, Colo., assignor to B. E. Moritz Instrument Company, Denver, Colo.

Application April 30, 1937, Serial No. 139,970

3 Claims. (Cl. 171—95)

The present invention relates to systems for producing a visual or similar record of electrical waves which may develop in any organ or tissue or a living body such as the heart, nerve, muscle, or gland tissue during its functional activity.

In devices of this character, such for example as electrocardiographs, it is of advantage to be able to produce and study amplifications of the electrical wave disturbances that occur in the human body.

The present invention contemplates the provision of a simple and effective means for producing visually, upon a fixed area, wave forms of the electrical waves under investigation so that the diagnosticians may observe the same directly, and without the intervention of photography and change and adjust the amplitude of the waves and the relative periodicity thereof so as to obtain therefrom a thorough understanding of the wave action as to form, frequency, and rhythmicity.

With the present device, the invention contemplates the carrying out of a complete analysis of the electrical wave produced in the living body of either man or animal immediately while the subject is under observation and without the necessity and expense of taking and developing photographs.

The invention contemplates also a device of this character which can be used for making photographic records of the waves produced in the body without changing the relation of the device to the subject in any manner.

The invention further contemplates a device of this character in which the instrument has a wide range of frequency response with minimum distortions due to inertia of the system itself.

Further and more specific features and advantages of the invention will appear as the description progresses, reference being had to the accompanying drawings wherein a preferred form of the invention is diagrammatically shown. It must be understood, however, that the drawings and description are illustrative only and cannot be considered as limiting the invention except in so far as it is limited by the claims.

In the drawings—

Figs. 1 and 1a together produce a complete wiring diagram of the system.

The invention is embodied in a polyelectrophysiograph which is an instrument comprising two cathode ray oscillograph units, standardizing equipment, high gain amplifier; power amplifier and loud speaker system, crystal microphone, suitably shielded input cables and electrodes, selector switches, control switches, and jack panel with suitable extension plug connections, all of which are properly connected so that, when properly operated, such phenomena as electrocardiograms, electrophonograms, electromyograms, electroneurograms, and electroencephalograms may be either viewed directly on the slow screen tube, photographed from either the slow or fast tube, or listened to, either separately or combined with either one of the others above mentioned methods of examination.

The cathode ray mechanism includes a cathode ray tube 5, which we shall term a fast tube, and a second cathode ray tube 6, which shall be termed a slow tube. Each cathode ray tube possesses a cathode ray screen composed of luminescent material of specific characteristics which forms an essential component of the tube itself, and that screen associated with the tube 6 and indicated at 7 is of a known type which retains the image or phosphorescent trace produced thereon by its being traversed by a cathode ray for a period of time sufficient to activate the luminescent material so that the phosphorescent trace will persist long enough for observation and study. The fast cathode ray tube includes means for varying the speed of the cathode ray there across from 15 upwards of 10,000 cycles. The slow tube 6 includes means for varying its horizontal sweep, or in other words the travel of the cathode ray horizontally thereon, from a speed of 15 cycles downwardly.

The details of the cathode ray circuit, while shown herein, will not be described except in so far as they relate to the present invention. The present invention is concerned only with the general features of the circuit, except in so far as the control of the horizontal sweep of a cathode ray across its screen is concerned.

The system includes a mixing or connecting panel indicated generally by the number 8 in Fig. 1a. This mixing or connecting panel includes a standardization battery 9, a millivolt meter 10, and suitable resistances 11 and 12 which are used for determining the degree of amplification so as to obtain a proper deflection on the cathode ray screen for a given voltage input into the amplification system. In this manner, the degree of deflection obtained upon the cathode ray screen can be made a measure of the potential variation that is being measured. A special switch 13 is utilized to control the standardization circuit as will be more clearly explained hereinafter.

The portions of the system shown on Fig. 1a include also a high gain amplifier 14. This amplifier is a three stage amplifier, and the first stage is adapted to be directly connected to lead cables from the patient by means of a connector plug 15 through a selector switch 16. Between the second and third stages of this amplifier, there is a potentiometer 17 by means of which the amplification of the amplifier may be varied. The output of the high gain amplifier is connected through a pair of terminal boards 18 and 19 to jacks a and b in the mixing board 8. All of the other connections, excepting the connection of the grid of the first tube of the high gain amplifier, are made through the mixing board 8. The reason why the grid of the first tube is not brought into the mixing board or jack panel is owing to the fact that distortion due to hum pick-up might occur at this point.

When the high gain amplifier 14 is being standardized so as to give the proper deflection of the cathode rays in the tubes 5 and 6 on their respective screens, it is necessary to connect the standardizing equipment shown at 9 to the grid of the first tube of the high gain amplifier by leads from jack c or jack d through boards 18 and 19 to the fourth contact of switch 16, and by turning the selector switch 16 to its fourth position. This connection is, of course, only made in order to determine the degree of amplification of the complete circuit as set up. As an example, the standardization unit is set to give a one millivolt drop, and the amplification is adjusted by means of the potentiometer 17 until one centimeter of deflection is registered on the cathode ray screen.

A power amplifier 21 is utilized for the purpose of listening to the heart tones or other sound phenomena, and this is so arranged that it can be used at the same time as the high gain amplifier is being used to produce a visible wave on the cathode ray screen. This power amplifier circuit is adapted to feed a loud speaker, not shown, through connections indicated at 22. The connection of a microphone or other means of conveying the sound waves to the high gain amplifier 14 may be made at the jack 20, as will be readily understood.

The power input to the amplifier 21 from the high gain amplifier 14 is established by plugging the output of the high gain amplifier from one of the jacks a, b to the jack e which is directly connected to the first stage of the power amplifier 21 through the terminal board 19 and a terminal board 23. The output of the high gain amplifier is carried to the cathode ray tubes 5 and 6 for causing a vertical deflection of the cathode ray by plugging from jack a or b to a jack f which leads to a terminal board 24 at 25. From this terminal board, the output of the high gain amplifier is carried to a switch 26 by means of which an amplifier 27 may be inserted in the circuit when it is desired to obtain additional amplification, for example, as in the case of encephalography. From the switch 26, leads are provided direct to the vertical plates 28 of the tubes 5 and 6. The horizontal plates 29 of the cathode ray tubes 5 and 6 lead to a switch 30 which is adapted to connect the horizontal plates to the output or plate lead of a tube 31 and to a tap switch 32. The switch 32 is for connecting the horizontal plates of the cathode ray tubes into a sweep circuit which controls the speed at which the horizontal plates of the cathode ray tubes will sweep the cathode ray across the screen in a horizontal direction.

The sweep circuit includes a series of condensers 33, 34, 35, and 36. The value of these condensers is such that a considerable variation in the capacity may be obtained by shifting the tap switch 32. For example, I have found that, by making condensers 33, 34, and 35 of one value and condenser 36 of substantially half that value, I can then obtain three different values by connecting the condensers 33 and 34 together to one tap for the tap switch 32. Obviously, any number of condensers of any desired value may be used. Voltage is applied to the condensers 33 to 36, inclusive, from the output of the tube 31 which is supplied from a power supply tube 38. The electrostatic voltage on the particular condenser in circuit is measured as the condenser charges, by a horizontal linear sweep of the cathode ray on the cathode ray screen. The rate of charge of the condenser can be varied by varying the impedance of the tube 31, and this is accomplished by varying the C bias of this tube by means of a variable resistance 39 in the tube circuit.

Normally, the condensers are all discharged by means of a switch 40 which maintains a short circuit across the condensers 33 to 36, inclusive. When the switch 40 is operated, it opens the short circuit and places the output voltage of the tube 31 across the condensers 33 to 36, or which ever one of them happens to be in circuit, and the condenser is charged at a rate dependent upon the adjustment of the tube 31 by means of the resistance 39. In this way, the voltage impressed upon the horizontal plate 29 of the tube 6 can be regulated to produce the desired rate of sweep. When the switch 40 is released, it again short circuits the condensers 33 to 36 causing the condensers to discharge and return the cathode ray to the original position.

The switch 40 also has contacts at 41 which control the application of voltage to the grid 42 of the cathode ray tube 6. When the switch is released, the contacts 41 of the switch open the cathode ray grid circuit so as to deenergize the ray and prevent it from leaving a trace across the screen 7 as it is being returned to its original position. When it is desired to use the fast tube 5, this can be done by merely throwing a switch 43 over to connect the horizontal plate 29 of the tube 5 into circuit with the horizontal plate 29 of the tube 6.

No attempt has been made to describe in detail the energizing circuits for the cathode ray tubes except in so far as they relate to the present invention because these circuits are well known in general and are not specifically a part of the present invention.

From the above description, it is believed that the construction and operation of this device will be readily apparent to those skilled in this art. It is also believed to be obvious that various minor modifications may be made without departing from the spirit and scope of the invention as disclosed in the appended claims.

Having thus described my invention, what I claim as new and desire to secure by Letters Patent is:

1. A system of the character described, comprising in combination an amplifier for amplifying minute electrical waves which may be detected in any organ or tissue of a living body, a cathode ray tube, means for connecting amplifier to said tube, said tube having a screen capable of retaining thereon a trace of the cathode ray long enough for it to be visually examined, said tube having a variable sweep control, means for varying the degree of amplification of said amplifier, and a standardization unit for determining the voltage input to said amplifier to produce a given deflection of the ray on the cathode ray screen.

2. A system of the character described, comprising in combination an amplifier for amplifying minute electrical waves which may be detected in any organ or tissue of a living body, a cathode ray tube, means for connecting the amplifier to said tube, said tube having a screen capable of retaining thereon a trace of the cathode ray long enough for it to be examined, means for varying the degree of amplification of said amplifier, and a standardization unit for determining the voltage input to said amplifier to produce a given deflection of the ray on the cathode ray screen.

3. In an instrument of the character described, the combination of a cathode ray tube having a screen capable of retaining thereon a trace of the cathode ray long enough to permit visual examination thereof, a multistage amplifier having means interposed before the last stage to vary the degree of amplification, a standardization device including a source of potential, and means for applying a measured portion of said potential to the input of said amplifier whereby a desired deflection of the cathode ray for a given potential input to said amplifier may be obtained.

BURT E. MORITZ, Jr.